(12) United States Patent
Moyal et al.

(10) Patent No.: US 6,430,198 B1
(45) Date of Patent: Aug. 6, 2002

(54) APPARATUS AND METHOD OF REDUCING PACKET LENGTH COUNT PROCESSING

(75) Inventors: Yehuda Moyal, Holon; Ilan Glaser, Tel-Aviv, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 08/970,545

(22) Filed: Nov. 14, 1997

(51) Int. Cl.[7] .................................................. H04J 3/24
(52) U.S. Cl. ........................................ 370/473; 370/470
(58) Field of Search ................................. 370/410, 426, 370/466, 470–476, 311

(56) References Cited

U.S. PATENT DOCUMENTS

| | | | | |
|---|---|---|---|---|
| 5,784,277 A | * | 7/1998 | Meyer ................... | 364/400.01 |
| 5,793,756 A | * | 8/1998 | Ayerst et al. ............... | 370/311 |
| 5,796,743 A | * | 8/1998 | Bunting et al. ............. | 370/474 |
| 5,878,045 A | * | 3/1999 | Timbs ........................ | 370/466 |
| 6,028,898 A | * | 2/2000 | Sparks et al. ............... | 375/317 |
| 6,098,110 A | * | 8/2000 | Witkowski et al. ......... | 709/249 |

* cited by examiner

Primary Examiner—Wellington Chin
Assistant Examiner—Brenda Pham
(74) Attorney, Agent, or Firm—Howard Zaretsky

(57) ABSTRACT

An apparatus for and a method of reducing the packet length count processing of data packets in a network device. The apparatus and method determine the length and end of a packet at the ingress point of the network computing device, e.g., a switch or router, using a single counting function. After the counting function verifies the length of the data packet, a signal indicating the length of a data packet is generated. This packet length indicator signal is then propagated throughout the system along with the data packet itself. The packet length indicator signal is then used at all decision points that involve the data packet. The packet length indicator signal itself is generated so as to indicate the beginning of the start of the data packet in addition to the end of the data packet, thus indicating the length of the packet. This obviates the need for the length of the packet to be counted over and over again in the course of processing the data packet within the switch or router.

24 Claims, 7 Drawing Sheets

APPARATUS AND METHOD OF REDUCING PACKET LENGTH COUNT PROCESSING

FIELD OF THE INVENTION

The present invention relates generally to data communications and more particularly relates to an apparatus for and method of counting the length of data packets.

BACKGROUND OF THE INVENTION

The use of packets to transmit data from one place to another is in widespread use today in the field of data communications. The transmission of data encapsulated into packets is common throughout the networking field. Network devices such as switches and routers typically operate on data packets having a known length or size. Within these network computer devices the data packet input typically passes several decision points during the switching and/or routing process. At each of these decision points, the end of the data packet must be determined using some form of counting function. This counting function is typically performed at each and every decision point in the system, wherever the length of the packet needs to be known. The need to constantly and repeatedly count the length of the packet is very wasteful in terms of processing resources and in terms of hardware requirements. The increased processing demands and circuit complexity translates to higher product cost which is a major disadvantage in today's highly competitive market.

A more detailed example of a prior art network computing device is given below to better illustrate the problems associated with the prior art. A high level block diagram illustrating an example prior art switching/routing device incorporating multiple packet length counting processes is shown in FIG. 1. The prior art device, generally referenced 12, comprises a plurality of processing units 19 numbered 1 through N. Each processing unit comprises a packet data processor 14 and a packet length processing unit 16. The packet data processors 14 are connected together sequentially in daisy chain fashion. Similarly, the packet length processing units 16 are connected together sequentially in daisy chain fashion. The input data packet is input to the packet data processor in processing unit #1 as indicated in FIG. 1 and proceeds through multiple decision points or points of processing throughout the network device.

For illustration purposes FIG. 1 shows the first and second processing point up to and including the $N^{th}$ processing point. Also input to the network computing device is a start of packet signal. The start of packet (SOP) signal is input to the packet length processing unit 16 in processing unit #1 and is daisy chained from one packet length processing unit to the next packet length processing unit. In addition, the SOP signal is generated as an output signal from the packet length processing unit 16 in processing unit #N to be used by network equipment located downstream.

Note that the packet length processor in each processing unit functions to generate the start of packet signal for the downstream processing units. In addition, the length counter functions to generate an end of packet (EOP) signal at any point along the packet length. For example, the packet length processor can generate the EOP one, two or three bytes before the end of the packet.

A timing diagram illustrating the start of packet signal input to each individual packet length counting processor is shown in FIG. 2. The signals shown in FIG. 2 represent two packet times, indicated as Packet A and Packet B. Each of the circled points A through D correspond to the similarly indicated circled points in the circuit of FIG. 1. Timing trace A represents the packet data input to the packet data processor 14 in processing unit #1. Timing trace B represents the SOP signal input to the packet length processor in processing unit #1. Timing trace C represents the packet data input to the packet data processor in processing unit #2. Timing trace D represents the SOP signal input to packet length processor in processing unit #2.

The input data shown in timing trace A comprises, for example, bytes labeled A1, A2, etc. The data unit may comprise any suitable data length such as a word, byte or bit. The start of packet (SOP) signal at timing trace B, labeled SOP A, is shown active for one data unit within packet A. Packet B follows, comprising bytes B1, B2, etc. Timing trace B also shows the SOP B signal associated with Packet B.

After a processing delay time, the Packet A data is output by the packet data processor in processing unit #1 and input to the packet data processor in processing unit #2, as represented by timing trace C. Similarly, the SOP A signal is output by the packet length processor in processing unit #1 after some time delay and input to the packet length processor in processing unit #2, as represented by timing trace D. The start of packet (SOP) signal at timing trace D, labeled SOP B, is shown active for one data unit within packet B.

The SOP A signal is processed by the packet length processor 16 in processing unit #1 and, after some time delay, is output to the packet length processor in processing unit #2 in synchronization with the packet A date. Each packet length processing unit must individually count the length of the packet received at that decision point within the network computing device. In this example, it is assumed that each data packet processing unit within the net,work computing device must have knowledge of the length of the packet it is processing. Thus, a major disadvantage of prior art circuits is that the length of the packet must be repeatedly calculated at each decision point within the device. Even though the start of packet signal is received by each packet length processing unit along with the data packet, the length of the packet must be separately and individually counted over and over again. This is very inefficient and wasteful in terms of hardware and silicon real estate utilization.

SUMMARY OF THE INVENTION,

The present invention is an apparatus for and a method of reducing the packet length count processing in a network device. Data communication devices such as switching and/or routing devices typically operate on data packets having a certain length. During internal processing of the switch or router the data packet typically passes several decision points where the end of the data packet must be determined using counting functions. The present invention discloses an apparatus for and a method of determining the end of a packet at the ingress point of the switching or routing device using a single counting function. After the counting function verifies the length of the data packet, a signal indicating the length of a data packet is generated. This packet length indicator signal is then propagated throughout the system along with the data packet itself. The packet length indicator signal is then used at all decision points that involve the data packet. The packet length indicator signal itself is generated so as to indicate the start of the data packet in addition to the end of the data packet, thus indicating the length of the packet. This obviates the need for the length of the packet to be counted over and over again in the course of processing the data packet within the network device, e.g., a switch or router.

There is therefore provided in accordance with the present invention a packet length processing apparatus comprising a packet length indicator generator for generating a packet length indicator signal from a start of packet signal input thereto the packet length indicator signal constructed so as to be indicative of the length of the data packet and a regenerator for outputting a regenerated start of packet signal for use by downstream computing devices, the regenerator operative to produce the regenerated start of packet signal from the packet length indicator signal.

The packet length indicator generator comprises a counter for counting up to a value L which is representative of the length of the data packet to be counted, the counter outputting an indication of the current count, detection means coupled to the output of the counter, the detection means for detecting when the current value of the counter reaches the value L whereupon a detection signal is generated and signal generator means for generating the packet length indicator signal from the detection signal output by the detection means and the start of packet signal. The detection means comprises means for loading the value L, wherein the value L is predetermined or is extracted from data within the packet.

The regenerator also comprises means for detecting the beginning of the packet length indicator signal and means for outputting a regenerated start of packet signal therefrom.

There is also provided in accordance with the present invention a network computing device connected to a source of input packet data and an input start of packet (SOP) signal, comprising a plurality of processing units numbered 1 through N connected together in daisy chain fashion, each processing unit adapted to receive an input packet data stream and an input packet length indicator (PLI) signal, each processing unit adapted to generate an output packet data stream and an output PLI signal, the output packet data stream and the output PLI signal input to the processing unit located downstream therefrom, a packet length indicator signal generator adapted to receive the input SOP signal, the PLI signal generator for counting the length of the packets and outputting the PLI signal in accordance thereto and a start of packet regenerator for generating an output SOP signal from the PLI signal, the output SOP signal output in synchronization with the packet data output by the last processing unit number N.

There is further provided in accordance with the present invention a method for reducing the packet length count processing in a network device, the method comprising the steps of generating a packet length indicator signal from a start of packet signal input to the network device, the packet length indicator signal constructed so as to be indicative of the length of a data packet thus obviating the need for downstream processing units to count the length of or determine the end of the packet.

BRIEF DESCRIPTION OF THE DRAWINGS

The invention is herein described, by way of example only, with reference to the accompanying drawings, wherein.

DETAILED DESCRIPTION OF THE INVENTION

Figure 1:
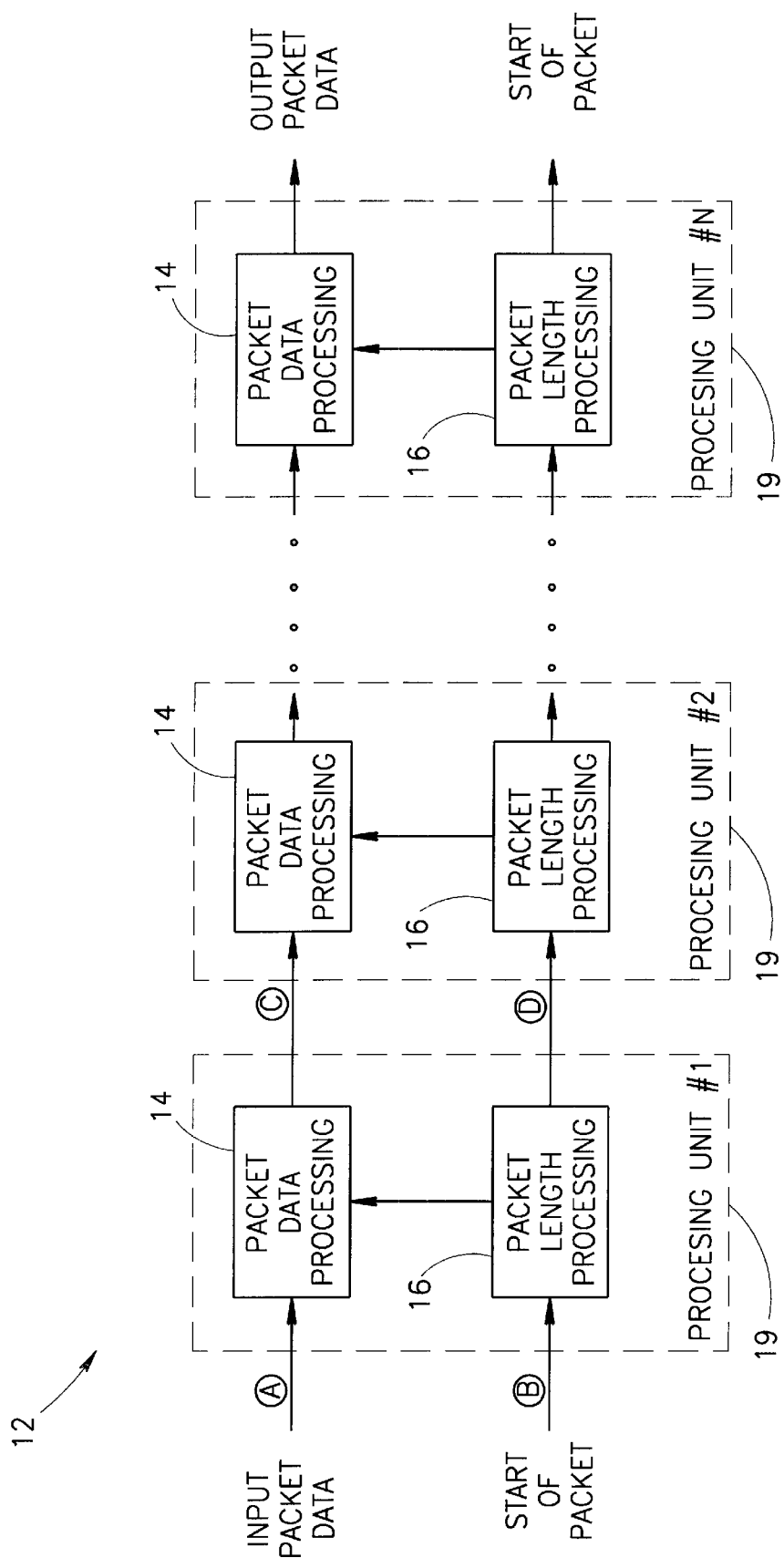
FIG. 1 is a high level block diagram illustrating an example prior art switching/routing device incorporating multiple packet length processes.
Figure 2:
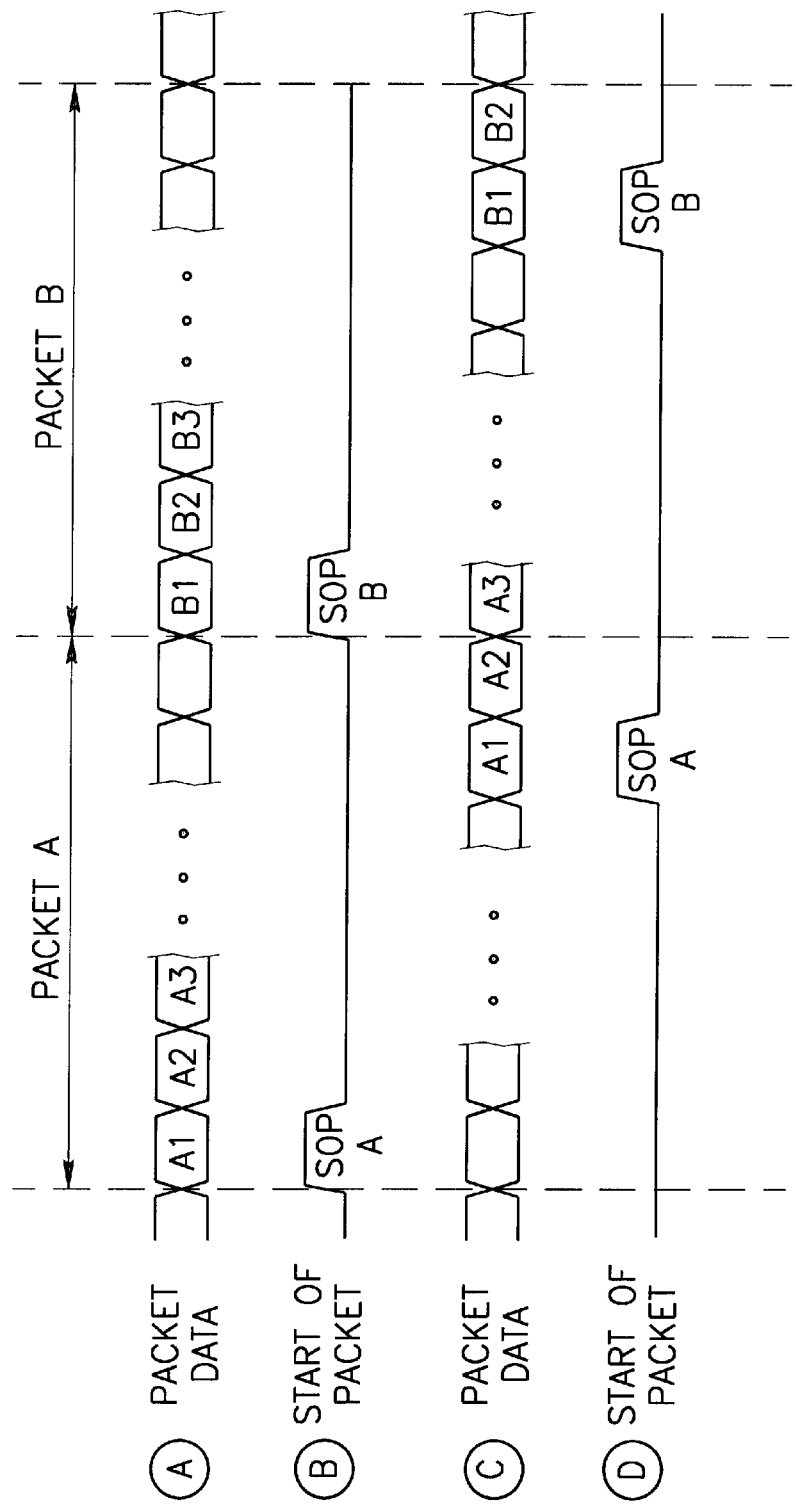
FIG. 2 is a timing diagram illustrating the start of packet signal input to each individual packet length counting processor in the prior art switching/routing device shown in FIG. 1.
Figure 3:
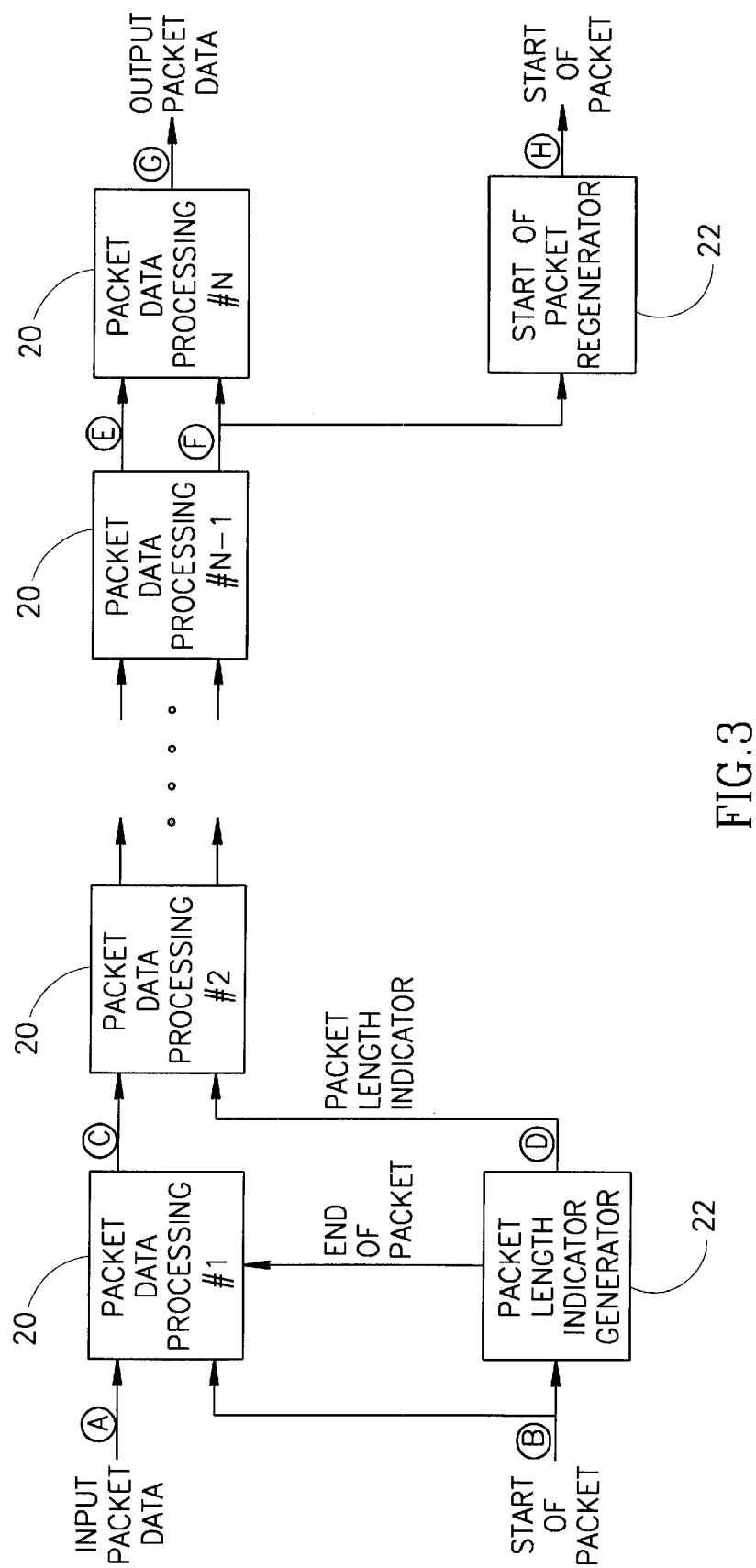
FIG. 3 is a high level block diagram illustrating the packet length counting device constructed in accordance with the present invention as applied to an example switching/routing device.

A high level block diagram illustrating a packet length processing device constructed in accordance with the present invention as applied to an example switching/routing device is shown in FIG. 3. The network device embodying the invention, generally referenced 10, comprises a plurality of packet data processing units 20, labeled packet data processing #1 through #N, a packet length indicator generator 22 and a start of packet regenerator 24. The input data packet is received by the packet data processing unit #1 and is passed from decision point to decision point within the computing device for processing. The packet data processor #1 also receives the SOP signal. The processor #1 comprises length counting circuitry which uses the SOP signal to provide circuitry with proper SOP timing.

The packet length indicator generator 22 also receives the start of packet signal and is operative to generate the packet length indicator signal which is then input to the packet data processing unit #2. In addition, the packet length indicator generator also outputs an end of packet signal which is input to the processor #1. The length counting circuitry in processor #1 uses the EOP signal to provide proper packet length timing signals to the internal circuitry within processor #1.

The processor #2, however, does not receive the SOP signal. Instead it receives the packet length indicator (PLI) signal output by the packet length indicator generator 22. The processor #2 also receives the packet data after being processed by processor #1. The packet data and a PLI signal are input to each processing stage in the device. Each processing stage adds its processing delay to the signals, however.

Thus, at each processing stage within the computing device it is not necessary to repeatedly generate and count the length of a packet. The PLI signal provides complete information about the start and the end of the packet, thus obviating the need for each processing stage to individually determine the packet's length and end.

The packet length indicator signal output from processing unit #N-1 is input to the processing unit #N in addition to a start of packet regenerator 24 which is operative to regenerate the start of packet signal for use by network equipment located downstream of the device 10. Thus, the processing unit #N only outputs packet data whereas the start of packet signal is output by the regenerator 24.

One skilled in the art will appreciate that rather than processing unit #1 including packet length counting circuitry, the PLI signal can be input to processor #1 instead, while delaying the input packet data in accordance with the processing delay in the PLI signal generator.

Figure 4:
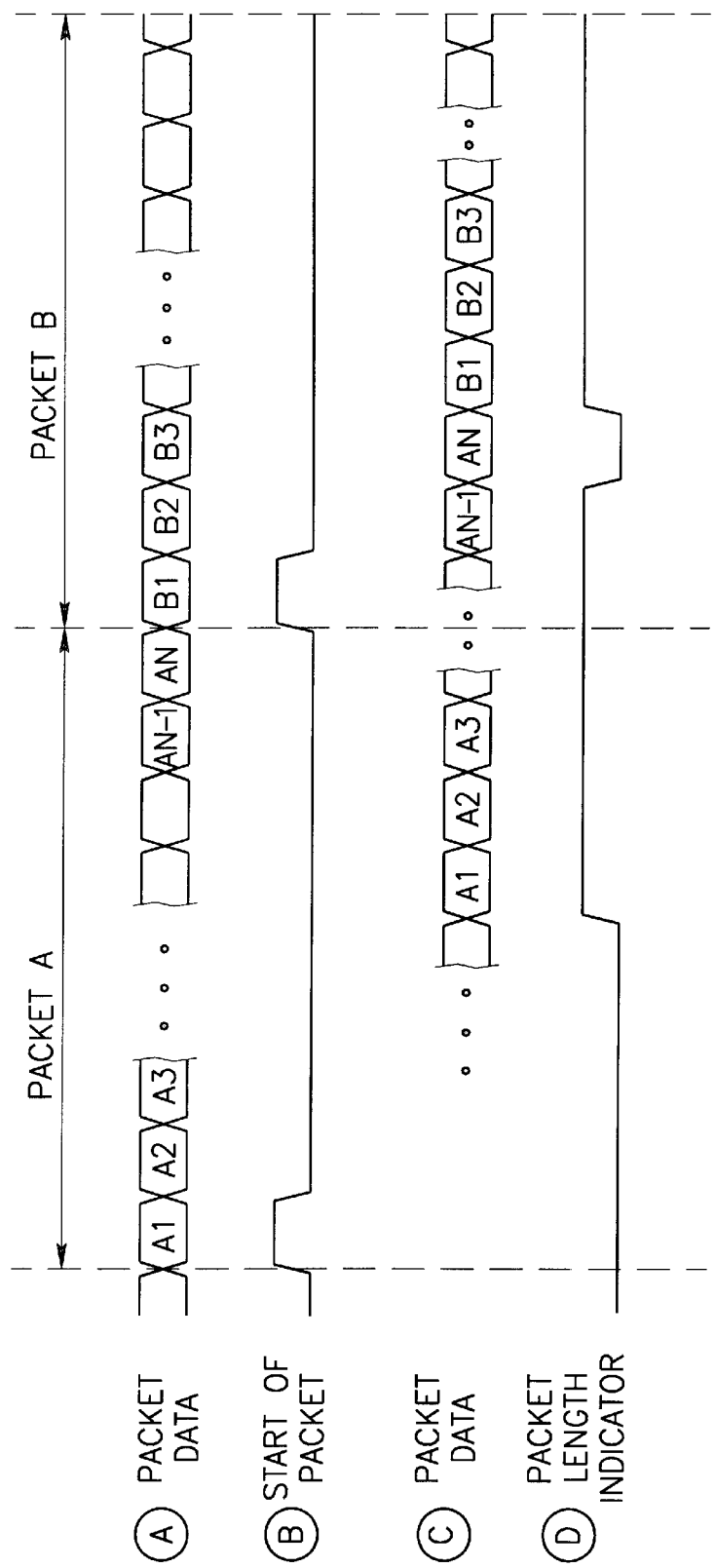
FIG. 4 is a timing diagram illustrating signals generated by the first and second processing units of the packet length counting device of the present invention.
Figure 5:
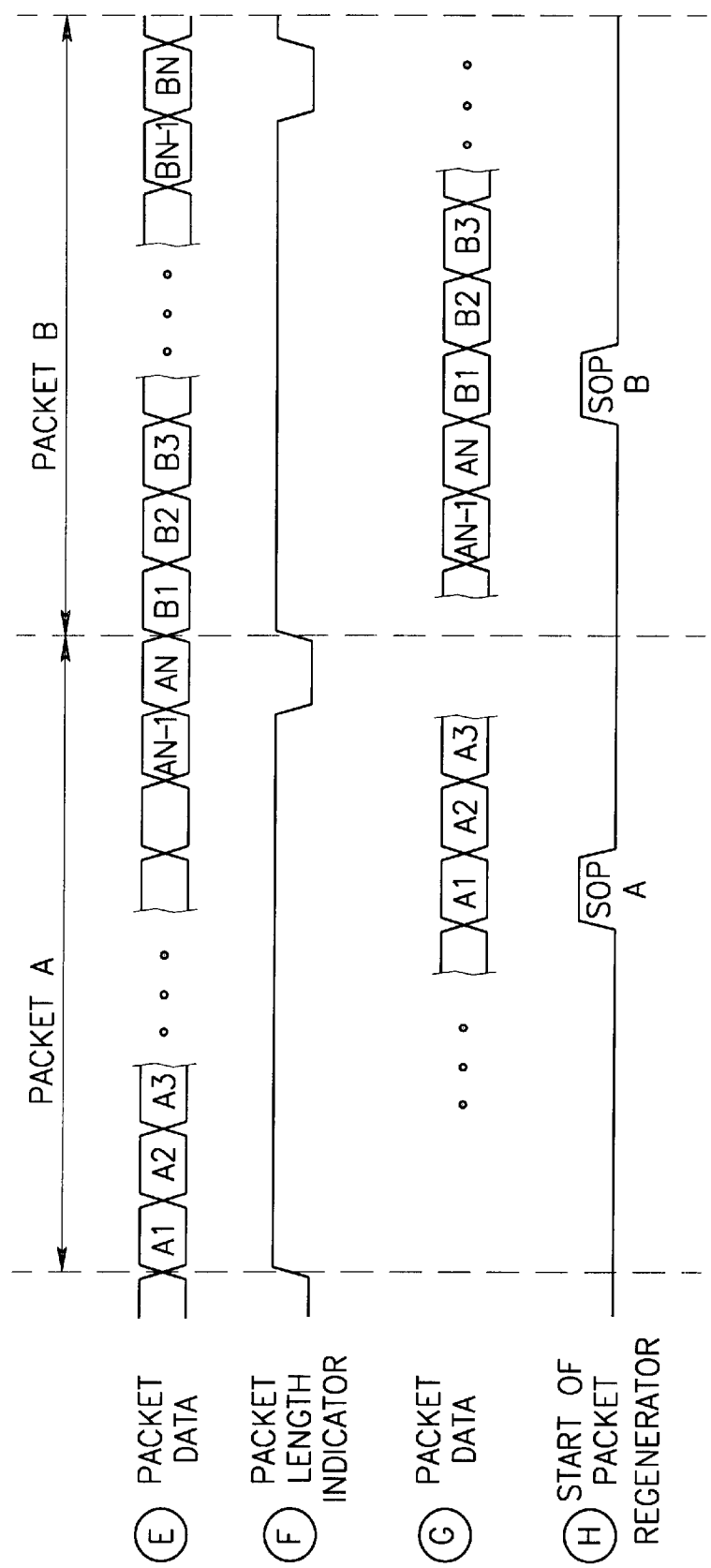
FIG. 5 is a timing diagram illustrating signals generated by the next to last and the last processing units of the packet length counting device of the present invention.

To aid in the understanding of the principles of the present invention, timing diagrams illustrating the various signals generated by the packet length counting device of the present invention is shown in FIGS. 4 and 5. Shown in FIG. 4 are the various internal signals present during two packet time periods for the processing units #1 and #2. Timing trace A represents the packet data input to the packet data processor #1. Timing trace B represents the SOP signal input to both the processor #1 and the PLI generator 22 (FIG. 3). Timing trace C represents the packet data input to the processor #2. Timing trace D represents the PLI signal output by the PLI generator.

The packet data in timing trace A is shown as a sequence of bytes, for example, labeled A1, A2, etc. for Packet A and B1, B2, etc. for Packet B. The SOP signal in timing trace B is the standard SOP signal input to the device from upstream hardware. There is an SOP signal associated with each packet. After some processing delay, the data is output by processor #1 and input to processor #2, as shown in timing trace C. The PLI signal generated by the PLI generator is also output and synchronized with the packet data, as shown in timing trace D. The PLI signal functions to indicate the length of a packet thus obviating the need for the length of the packet to be counted at each processing unit within the device.

Shown in FIG. 5 are the various internal signals present during two packet time periods for the processing units #N-1 and #N. Timing trace E represents the packet data output by the processor #N-1 and input to the packet data processor #N. Timing trace F represents the PLI signal output by the processor #N-1 and input to both the processor #N and the SOP regenerator 24 (FIG. 3). Timing trace G represents the packet data output by processor #N. Timing trace H represents the SOP signal output by the SOP regenerator to network equipment located downstream.

The packet data in timing trace E is shown as a sequence of bytes, for example, labeled A1, A2, etc. for Packet A and B1, B2, etc. for Packet B. The PLI signal in timing trace F is the PLI signal input to each processing stage. There is a PLI signal associated with each packet. After some processing delay, the data is output by processor #N-1 and input to processor #N, as shown in timing trace G. The PLI signal is used by the SOP regenerator to produce the SOP output signal, synchronized with the output packet data, as shown in timing trace H. The SOP signal functions to indicate the length of a packet for downstream network equipment.

In order to comply with various communication standards, the start of packet signal sent to downstream network or communication devices must be in the same form as received at the input to the device. The start of packet signal regenerator 24 functions to generate the original form of the start of packet signal point as shown in the timing diagram of FIG. 5 at timing trace H.

Figure 6:
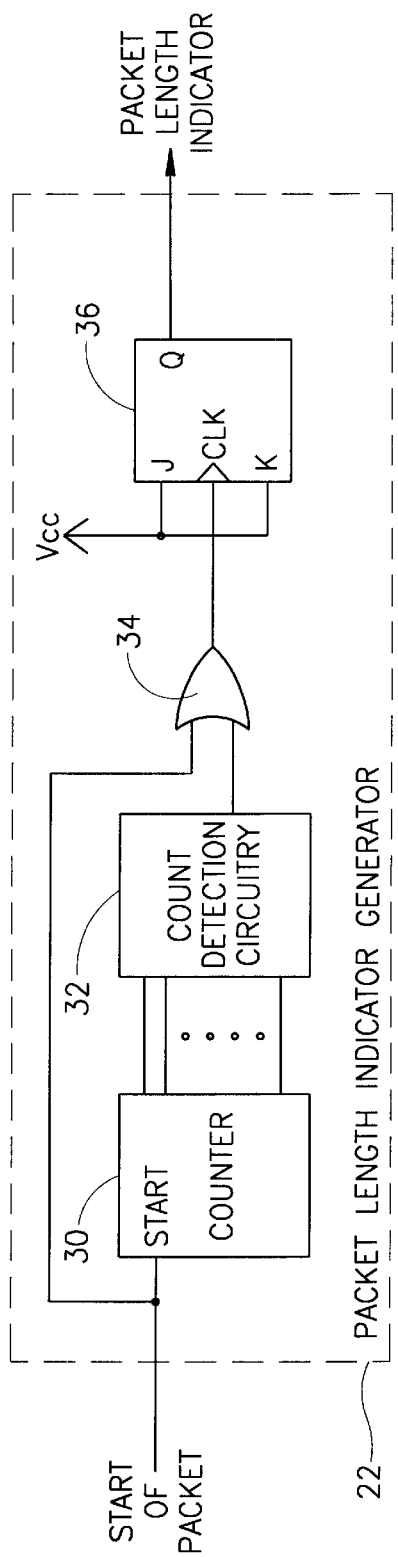
FIG. 6 is schematic diagram illustrating the packet length indicator portion of the present invention in more detail.

The packet length indicator generator and the start of packet regenerator will now be described in more detail. A schematic diagram illustrating the packet length indicator generator of the present invention in more detail is shown in FIG. 6. The packet length indicator generator comprises a counter 30, count detection circuitry 32, an OR gate 34 and a JK flip-flop 36. The counter 30 is constructed to count up to a count L which corresponds to the length of the data packet to be counted. The value L can either be predefined and loaded into the count detection circuitry 32 or it can be extracted from the packet data itself.

The start of packet signal is input to the START input of the counter and is used to start the counter running in order to measure the length of a packet. The output of the counter is input to the count detection circuitry 32 which is operative to detect when the counter has reached the count L which corresponds to the length of the packet. When the counter output reaches L, the count detection circuitry functions to output a high logic level, i.e., a '1'. The JK flip-flop 36 is configured with the J and K inputs tied to a high logic level such as the supply voltage, i.e., $V_{cc}$. The Q output forms the packet length indicator signal. The start of packet signal is also input to one of the two inputs of the OR gate 34. The other input being the output of the count detection circuitry 32. The output of the OR gate forms the clock input to the JK flip-flop 36. Thus, when either the start of packet or the output of the count detection circuitry goes high, the JK flip-flop is toggled.

The operation of the packet length indicator generator will now be described in more detail. It is assumed that the counter and the JK flip-flop are both reset initially. The start of packet signal goes high to indicate the beginning of a packet. The start of packet signal going high causes the output of the OR gate to go high which immediately causes the JK flip-flop to toggle high. Thus, the packet length indicator signal goes high immediately along with the start of packet signal going high. The start of packet signal is also active to start the counter running. Meanwhile, the start of packet signal itself returns to zero while the counter is running. When the counter value reaches L the count detection circuitry outputs a high which causes the JK flip-flop to toggle its output low, thus resetting the packet length indicator signal. In this fashion, the packet length indicator signal functions to indicate the length of a packet.

Figure 7:
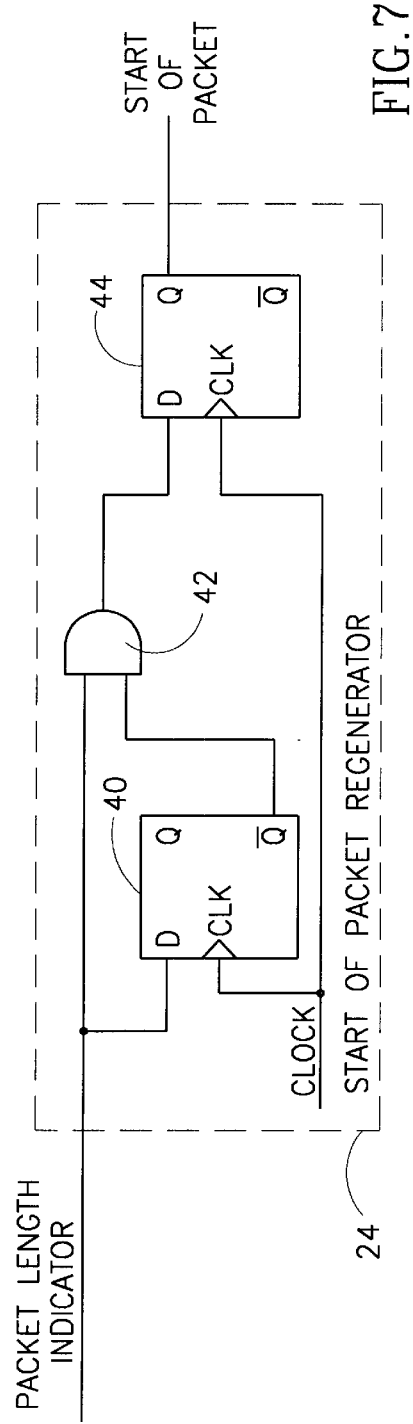
FIG. 7 is a schematic diagram illustrating the start of packet regenerator portion of the present invention in more detail.

A schematic diagram illustrating the start of packet regenerator of the present invention in more detail is shown in FIG. 7. The start of packet regenerator 24 comprises a D flip-flop 40, an AND gate 42 and a second D flip-flop 44. The packet length indicator signal is input to the D input of flip-flop 40 and one of the inputs to the AND gate 42. The clock inputs to flip-flops 40, 44 are tied to a suitable clock signal. It is assumed that both flip-flops are initially reset. Thus, a '1' from the $\overline{Q}$ output of flip-flop 40 is input to one of the two inputs of AND gate 42. In addition, the Q output of flip-flop 44 which represents the start of packet signal, is at a low. While the packet length indicator signal remains low, a '0' is clocked into flip-flop 40 thus generating a '1' at the $\overline{Q}$ output which is input to AND gate 42. The output of the AND gate 42 remains a '0' which is clocked into flip-flop 44 which outputs a '0' from its Q output. When the packet length indicator signal goes high, the output of AND gate 42 immediately goes high. At the next occurrence of the clock the output of the flip-flop 44 goes high thus raising the start of packet signal output to a '1'. During the same clock period, the '1' present at the input of the flip-flop 40 is clocked in causing the $\overline{Q}$ output to go low thus bringing the D input to flip-flop 44 low. At the next occurrence of the clock, the low input at flip-flop 44 is clocked through to the Q output causing the start of packet signal to return to the '0' level. While the packet length indicator signal is high, the input to the flip-flop 44 remains low thus keeping the start of packet output signal at a low level until the arrival of the next packet length indicator signal.

Figure 8:
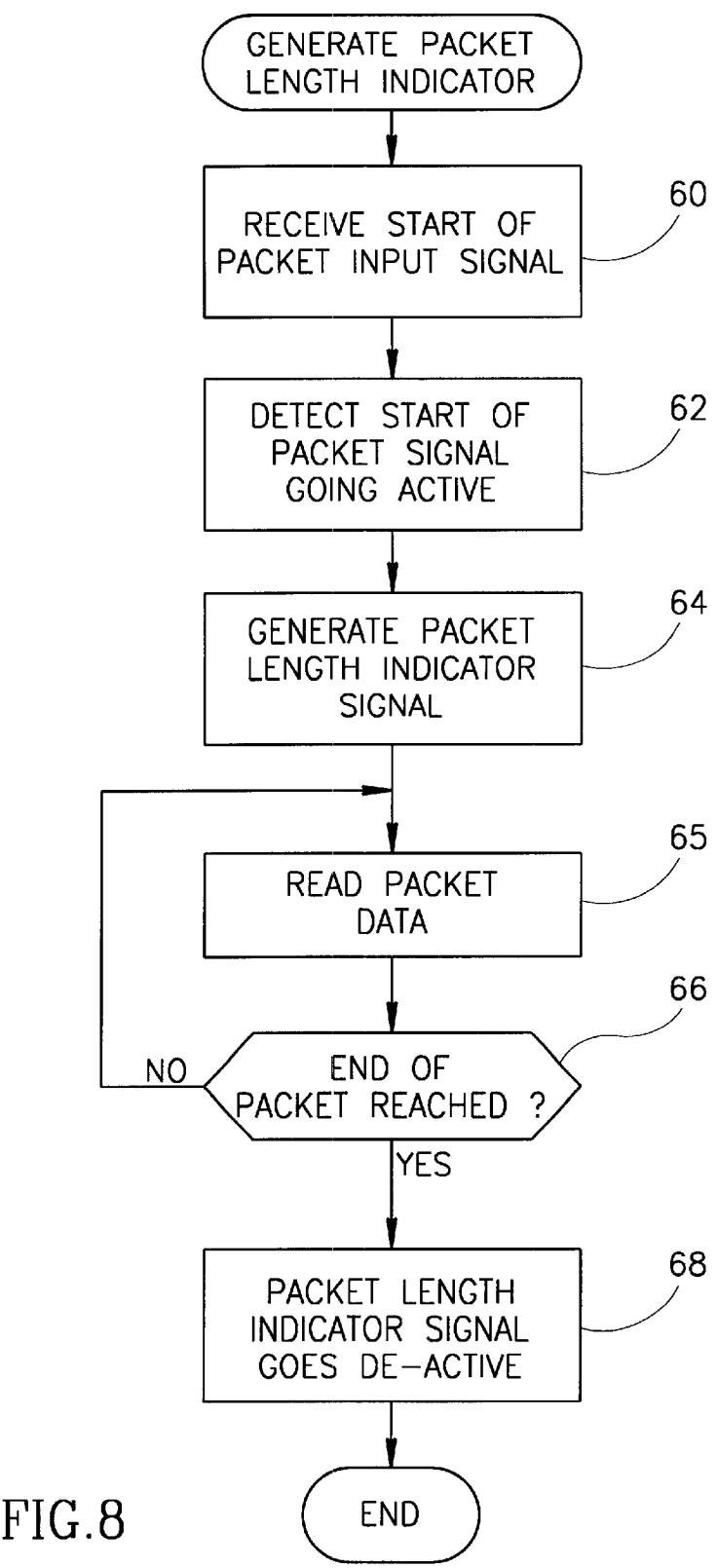
FIG. 8 is a high level flow diagram illustrating the method of the present invention of generating a packet length indicator signal.

A high level flow diagram illustrating the method of the present invention of generating a packet length indicator signal is shown in FIG. 8. The following method can be implemented inside any device that requires knowledge of the length of data packets received thereby, e.g., any standard network or communication device. Initially, the start of packet signal is received by the device (step 60). The start of packet signal going active is then detected (step 62). In the timing diagram shown in FIG. 4, the start of packet signal is active high. Thus, in this step, the rising edge or the high level of the signal would be detected. Once the signal is detected going active, the packet length indicator signal is made active in response thereto (step 64). Thus, in this example, the packet length indicator signal is brought high. Each data element of the packet is then read in and counted (step 65) until the end of the data packet is reached (step 66). Once reached, the packet length indicator signal is brought inactive, i.e., made low (step 68).

While the invention has been described with respect to a limited number of embodiments, it will be appreciated that many variations, modifications and other applications of the invention may be made.

What is claimed is:

1. A network processing apparatus, comprising:
   a packet length indicator generator for detecting the end of a packet and in response thereto and to a start of packet signal, generating a packet length indicator signal comprising a pulse, the duration of the active portion of which represents the length of the data packet; and
   a regenerator for outputting a regenerated start of packet signal for use by downstream computing devices, said regenerator operative to produce the regenerated start of packet signal from said packet length indicator signal.

2. The apparatus according to claim 1, wherein said packet length indicator generator comprises:
   a counter for counting up to a value L which is representative of the length of the data packet to be counted, said counter outputting an indication of the current count;
   detection means coupled to the output of said counter, said detection means for detecting when the current value of said counter reaches the value L whereupon a detection signal is generated; and
   signal generator means for generating said packet length indicator signal from said detection signal output by said detection means and the start of packet signal.

3. The apparatus according to claim 2, wherein said detection means comprises means for loading said value L, wherein said value L is predetermined.

4. The apparatus according to claim 2, wherein said detection means comprises means for loading said value L, wherein said value L is extracted from data within said packet.

5. The apparatus according to claim 1, wherein said regenerator comprises means for detecting the beginning of said packet length indicator signal and means for outputting a regenerated start of packet signal therefrom.

6. A network computing device connected to a source of input packet data and an input start of packet (SOP) signal, comprising:
   a plurality of processing units connected together in daisy chain fashion, each processing unit adapted to receive an input packet data stream and an input packet length indicator (PLI) signal, each processing unit adapted to generate an output packet data stream and an output PLI signal, said output packet data stream and said output PLI signal input to the processing unit located downstream therefrom;
   a packet length indicator generator adapted to receive said input SOP signal, said PLI signal generator for determining the length of said packets and outputting an PLI signal for a first processing unit in said chain comprising a pulse the duration of which represents the length of a packet; and
   a start of packet regenerator for generating an output SOP signal from said PLI signal such that said output SOP signal is in synchronization with the packet data output by as last processing unit in said chain.

7. The device according to claim 6, wherein said packet length indicator signal generator comprises:
   a counter for counting up to a value L which is representative of the length of the data packet to be counted, said counter outputting an indication of the current count;
   detection means coupled to the output of said counter, said detection means for detecting when the current value of said counter reaches the value L whereupon a detection signal is generated; and
   signal generator means for generating said PLI signal from said detection signal output by said detection means and the input SOP signal.

8. The apparatus according to claim 7, wherein said detection means comprises means for loading said value L, wherein said value L is predetermined.

9. A The apparatus according to claim 7, wherein said detection means comprises means for loading said value L, wherein said value L is extracted from data within said packet.

10. The device according to claim 6, wherein said start of packet regenerator comprises means for detecting the beginning of said packet length indicator signal and means for outputting a regenerated start of packet signal therefrom.

11. A network processing apparatus, comprising:
    a packet length indicator generator for detecting the end of a packet and in response thereto and to a start of packet signal, generating a packet length indicator signal comprising a pulse the duration of the active portion of which is indicative of the length of a data packet;
    a plurality of processing modules, each processing module adapted to receive packet data and said packet length indicator signal; and
    means for propagating said packet length indication signal to said plurality of processing modules.

12. A packet length processing apparatus, comprising:
    a counter for counting up to a value L which is representative of the length of a data packet to be counted, said counter outputting an indication of the current count;
    detection means coupled to the output of said counter, said detection means for detecting when the current value of said counter reaches the value L whereupon a detection signal is generated; and
    signal generator means for generating said packet length indicator signal from said start of packet signal and said detection signal output by said detection means.

13. A method of reducing the packet length count processing in a network device incorporating a plurality of processing modules, said method comprising the steps of:
    generating a packet length indicator signal from a start of packet signal input to said network device, said packet length indicator signal generated to comprise a pulse the duration of the active portion of which represents the length of a data packet; and
    propagating said packet length indicator signal to said plurality of processing modules within said network device.

14. The method according to claim 13, further comprising the step of generating and outputting a regenerated start of packet signal for use by downstream computing devices, said regenerated start of packet signal generated from said packet length indicator signal.

15. In a network computing device, a method for reducing the packet length count processing, said method comprising the steps of:

generating a packet length indicator signal from a start of packet signal input to said network device, said packet length indicator signal generated to comprise a pulse the duration of the active portion of which is representative of the length of the data packet; and generating and outputting a regenerated start of packet signal for use by downstream computing devices, said regenerated start of packet signal generated from said packet length indicator signal.

16. The apparatus according to claim 1, wherein said packet length indicator signal is generated so as to indicate the end of a packet in addition to its length.

17. The device according to claim 6, wherein said packet length indicator signal is generated so as to indicate the end of a packet in addition to its length.

18. The apparatus according to claim 11, where said packet length indicator signal is constructed so as to indicate the start of a packet in addition to its length.

19. The apparatus according to claim 11, wherein said packet length indicator signal is constructed so as to indicate the end of a packet in addition to its length.

20. The apparatus according to claim 11, further comprising a start of packet regenerator adapted to detect the beginning of said packet length indicator signal and outputting a regenerated start of packet signal in response thereto.

21. The method according to claim 13, wherein said packet length indicator signal is generated so as to indicate the start of a packet in addition to its length.

22. The method according to claim 13, wherein said packet length indicator signal is generated so as to indicate the end of a packet in addition to its length.

23. The method according to claim 13, further comprising the step of detecting the beginning of said packet length indicator signal and outputting a regenerated start of packet signal in response thereto.

24. In a network computing device, a method for reducing the packet length count processing in a network device, said method comprising the steps of:

generating a packet length indicator signal from a start of packet signal input to said network device, said packet length indicator signal comprising a pulse having a first transition representing the start of a data packet, a second transition representing the end of said data packet and a pulse duration the active portion of which is representative of the length of said data packet; and generating and outputting a regenerated start of packet signal for use by downstream computing devices, said regenerated start of packet signal generated from said packet length indicator signal.

* * * * *